United States Patent
Li et al.

(10) Patent No.: US 10,674,538 B2
(45) Date of Patent: Jun. 2, 2020

(54) METHOD AND DEVICE FOR COMPETITIVE TRANSMISSION

(71) Applicant: ZTE CORPORATION, Guangdong (CN)

(72) Inventors: Nan Li, Guangdong (CN); Kaiying Lv, Guangdong (CN); Bo Sun, Guangdong (CN); Weimin Xing, Guangdong (CN); Zhiqiang Han, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 62 days.

(21) Appl. No.: 15/736,577

(22) PCT Filed: Jun. 23, 2016

(86) PCT No.: PCT/CN2016/086879
§ 371 (c)(1),
(2) Date: Dec. 14, 2017

(87) PCT Pub. No.: WO2016/206601
PCT Pub. Date: Dec. 29, 2016

(65) Prior Publication Data
US 2018/0176951 A1    Jun. 21, 2018

(30) Foreign Application Priority Data

Jun. 23, 2015    (CN) .......................... 2015 1 0351221

(51) Int. Cl.
*H04W 74/08*    (2009.01)
(52) U.S. Cl.
CPC .................. *H04W 74/08* (2013.01)

(58) Field of Classification Search
CPC ..................................................... H04W 74/08
(Continued)

(56) References Cited

U.S. PATENT DOCUMENTS

2006/0193274 A1    8/2006  Yamagata
2009/0109904 A1*   4/2009  Gaur ................. H04W 74/0808
                                                370/329

(Continued)

FOREIGN PATENT DOCUMENTS

CN    101547497 A    9/2009
CN    102118308 A    7/2011
(Continued)

OTHER PUBLICATIONS

Chern H-T et al., "Enhanced Distribution Channel Access Modification of the Initial & Thereafter CW (EDCA-MITCW)", 2012 International Conference on Systems and Informatics (ICSAI), pp. 1397-1401 (May 20, 2012).

(Continued)

*Primary Examiner* — Christopher R Crompton
(74) *Attorney, Agent, or Firm* — Li & Cai International Property (USA) Office

(57) ABSTRACT

Provided in the present invention are a method and device for competitive transmission. The method comprises: an access point transmits a trigger frame or a radio frame carrying a trigger information domain to a non-access point to trigger the non-access point to perform uplink multiuser transmission; and, when data transmitted by the non-access point is received by the access point, same resets a competitive window of an access type to an initial value.

11 Claims, 7 Drawing Sheets

(58) Field of Classification Search
USPC .................................................. 370/329
See application file for complete search history.

(56) References Cited

U.S. PATENT DOCUMENTS

| | | | |
|---|---|---|---|
| 2009/0135726 A1 | 5/2009 | Balan et al. | |
| 2012/0063406 A1* | 3/2012 | Seok | H04W 72/046 370/329 |
| 2012/0106371 A1* | 5/2012 | Abraham | H04B 7/0452 370/252 |
| 2012/0170453 A1* | 7/2012 | Tiwari | H04W 76/18 370/230 |
| 2013/0089036 A1 | 4/2013 | Cho et al. | |
| 2014/0079046 A1 | 3/2014 | Yang et al. | |
| 2015/0063257 A1 | 3/2015 | Merlin et al. | |
| 2015/0071051 A1 | 3/2015 | Zhu et al. | |
| 2015/0085658 A1* | 3/2015 | Hong | H04W 28/0289 370/235 |
| 2017/0170937 A1* | 6/2017 | Chun | H04L 5/0048 |
| 2017/0188280 A1* | 6/2017 | Watfa | H04W 36/12 |
| 2017/0325266 A1* | 11/2017 | Kim | H04W 84/12 |
| 2018/0288743 A1* | 10/2018 | Choi | H04L 27/2602 |
| 2018/0310330 A1* | 10/2018 | Chun | H04L 5/0053 |

FOREIGN PATENT DOCUMENTS

| | | |
|---|---|---|
| CN | 102387592 A | 3/2012 |
| CN | 104640229 A | 5/2015 |
| JP | 2006-135441 A | 5/2006 |
| JP | 2012-94976 A | 5/2012 |
| JP | 2013-515438 A | 5/2013 |
| JP | 2013-515440 A | 5/2013 |
| WO | 2013/055762 A1 | 4/2013 |
| WO | WO 2015/031440 A1 | 3/2015 |
| WO | WO 2016/028131 A1 | 2/2016 |
| WO | WO 2016/089059 A1 | 6/2016 |

OTHER PUBLICATIONS

Zhang B., "Performance Analysis and Improvement of DCF Protocol in IEEE 802.11 Wireless Networks", Electronic Technology & Information Science, China Doctoral Dissertations Full-Text Database, No. 12 (Dec. 15, 2013), together with an English-language abstract.

International Search Report dated Sep. 21, 2016 issued in PCT/CN2016/086879.

Achary, R. et al, "A New QoS Architecture for Performance Enhancement of IEEE 802.IIe EDCA by Contention Window Adaption", 2012 Fourth International Conference on Computational Intelligence and Communication Networks (CICN), Nov. 5, 2012 (Nov. 5, 2012).

European Extended Supplementary Search Report dated May 16, 2018 received in European Patent Application No. 16 81 3717.2.

* cited by examiner

METHOD AND DEVICE FOR COMPETITIVE TRANSMISSION

CROSS-REFERENCE TO RELATED APPLICATION

This application is based upon and claims priority to PCT Application No. PCT/CN2016/086879, filed Jun. 23, 2016, which is based upon and claims priority to Chinese Patent Application No. 201510351221.8, filed Jun. 23, 2015, the entire contents of which are incorporated herein by reference.

TECHNICAL FIELD

The present disclosure relates to the field of communication, and more particularly, to a method and a device for competitive transmission.

BACKGROUND

Now, as wireless local area networks (Wireless Local, referred to as WLAN) have been widely used for data communication, WLAN network loads are constantly increasing. With the increase in the number of users, the efficiency of the WLAN network exhibits an apparent lowering trend. Simply increasing the rate cannot solve this problem. As an alternative technology to address the network efficiency, multi-user parallel transmission has attracted wide attention and research. In the related art, the multi-user parallel transmission technologies include multi-user Multiple Input Multiple Output (MU-MIMO) technology (Spatial Domain Multiple Access), Orthogonal Frequency Division Multiple Access (OFDMA) technology (Frequency Domain Multiple Access) and so on.

In a WLAN, an access point (AP) and a plurality of non-AP stations (non-AP STAs) associated with the AP form a basic service set (BSS), as shown in FIG. 1. The multi-user parallel transmission in a WLAN generally means that the plurality of non-AP STAs transmit data to the AP simultaneously, referred to as uplink multi-user (UL MU) transmission, or the AP transmits data to the plurality of non-AP STAs simultaneously, referred to as downlink multi-user (DL MU) transmission. A typical uplink-downlink multi-user transmission frame exchange sequence is as shown in FIG. 2.

In an existing solution, the AP is required to trigger a UL MU transmission. For example, the AP may send a trigger frame to trigger, or the AP may trigger by a radio frame carrying a trigger information field in the radio frame. The trigger frame or the radio frame carrying a trigger information field carries scheduling information of the station, such as identification information of the station, time for uplink transmission of the station, frequency resource information, time-frequency offset calibration information of the station, the package length of uplink transmission of the station, and so on. After the AP sends the trigger frame or the radio frame carrying a trigger information field, the station receives the trigger frame or the radio frame carrying a trigger information field. If the identification information of a station is carried in the trigger frame or the radio frame, it means that the station is scheduled in this UL MU transmission. If the station has data to be transmitted, the station may get prepared, and may get synchronized according to the time-frequency offset calibration information instructed by the AP, and transmit the data at the allocated time and frequency resource.

In the related art, data transmission modes of a WLAN system with Quality of Service (QoS) may be classified into competitive transmission and non-competitive transmission. The competitive transmission mechanism refers to an enhanced distributed channel access mechanism (EDCA). That is, the service stream data has a priority attribute, each data packet of the service stream is mapped to one of 4 Access Category (AC) queues, waiting for transmission according to the priority. Each AC has a set of competitive parameters. The competitive parameters include arbitration interframe space (AIFS), maximum duration for occupying channel and transmission, Contention Window max (CWmax) and Contention Window minimum CWmin Different AC competitive parameters may take different values, and may have different AC priorities. The non-competitive transmission mechanism refers to HCF controlled channel access (HCCA). The data packet of the service stream transmitted through the non-competitive transmission mechanism does not actively compete for a channel, but sends the data packet to the AP after the station receives a polling frame sent from the AP.

The transmission of the 4 ACs is performed competitively. Specifically, the competing process is that for each AC, a station sets up an initial value of a CW window as CWmin, selects an integer randomly between [0, CWmin], and sets a Backoff timer with the value. Then, the station monitors a channel, when the channel idle time period satisfies the AIFS of the AC, the station performs a random backoff. Each time the station monitors an idle time slot, the Backoff timer decreases by 1. When the Backoff timer reaches 0, the AC acquires a transmission opportunity and transmits data. When the transmission collision occurs, CW increases exponentially and the final value of CW does not exceed CWmax. When the transmission is performed successfully, the value of CW is reset to CWmin A control frame and a management frame are not data frames, and in the related art, it is generally prescribed that the control frame and the management frame are transmitted through a particular AC.

In the related art, the trigger frame may be transmitted at a predetermined transmission time instant, or may be transmitted in a competitive manner. For example, the station may be instructed to report their respective length of the AC buffer queue. After the AP side acquires the buffer data length of the AC queue from the station side, the uplink AC queue also participates in the competition at the AP side. If an uplink AC completes successfully, the trigger frame of the AC queue is sent to trigger UL MU transmission.

However, the related art does not have a solution as how to set the CW value and the Backoff timer of the uplink AC queue at the station side and the AP side, after a trigger frame is sent in a competitive manner, and the station performs UL MU transmission according to the instruction of the trigger frame.

No effective solution has been proposed yet as to how to set the CW value and the Backoff timer of the uplink AC queue at the station side and the AP side, after a trigger frame is sent in a competitive manner in the related art.

This section provides background information related to the present disclosure which is not necessarily prior art.

SUMMARY

The present disclosure provides a method and a device for competitive transmission, to at least solve the problem in the related art as how to set the competition parameters of the uplink AC queue at the AP side and the non-AP station side, after a trigger frame is sent in a competitive manner.

According to one aspect of the present disclosure, there is provided a method for competitive transmission, including: sending, by an access point (AP), a trigger frame or a radio frame carrying a trigger information field to at least one non-AP station (non-AP STA), to trigger the at least one non-AP STA to perform uplink multi-user (UL MU) transmission; and resetting, by the AP, a contention window (CW) of an access category (AC) to an initial value upon receiving data transmitted by the at least one non-AP STA.

Optionally, the AC refers to an access category designated by the AP in the trigger frame or the radio frame carrying a trigger information field, for the at least one non-AP STA to transmit data of that access category in the UL MU transmission.

Optionally, the method further includes: after the AP receives the data, adjusting, by the AP, a length parameter of a buffer queue of the AC corresponding to the data.

Optionally, the method further includes: when the data contains a length parameter of a buffer queue of at least one AC of the at least one non-AP STA, adjusting, by the AP, a length parameter of a buffer queue of at least one AC of the AP according to the length parameter of the buffer queue of the at least one AC.

Optionally, the trigger frame or the radio frame carrying a trigger information field carries instruction information for instructing the at least one non-AP STA to send service stream data which is transmitted in a non-competitive manner.

According to one aspect of the present disclosure, there is provided another method for competitive transmission, including: sending, by an access point (AP), a trigger frame or a radio frame carrying a trigger information field to at least one non-AP station (non-AP STA), to trigger the at least one non-AP STA to perform uplink multi-user (UL MU) transmission; wherein the AP designates in the trigger frame or the radio frame carrying a trigger information field an AC for the at least one non-AP STA to transmit data of that access category in the UL MU transmission; or the AP designates in the trigger frame or the radio frame carrying a trigger information field instruction information for instructing the at least one non-AP STA to send service stream data which is transmitted in a non-competitive manner.

Optionally, the method further includes: resetting, by the AP, a contention window (CW) of an access category (AC) to an initial value upon receiving data transmitted by the at least one non-AP STA.

Optionally, the method further includes: after the AP receives the data, adjusting, by the AP, a length parameter of a buffer queue of the AC corresponding to the data.

Optionally, the method further includes: when the data contains a length parameter of a buffer queue of at least one AC of the at least one non-AP STA, adjusting, by the AP, a length parameter of a buffer queue of at least one AC of the AP according to the length parameter of the buffer queue of the at least one AC.

According to another aspect of the present disclosure, there is provided another method for competitive transmission, including: receiving, by a non-access-point station (non-AP STA), a trigger frame or a radio frame carrying a trigger information field sent by an access point (AP); transmitting, by the non-AP STA, data to the AP according to the trigger frame or the radio frame carrying a trigger information field; resetting, by the non-AP STA, a contention window (CW) of an access category (AC) corresponding to the data to an initial value, upon receiving a response message from the AP; and setting to zero, by the non-AP STA, a Backoff timer of the AC corresponding to the data.

Optionally, the trigger frame or the radio frame carrying a trigger information field carries an access category designated by the AP for at least one non-AP STA to transmit data of that access category in uplink multi-user (UL MU) transmission; or the trigger frame or the radio frame carrying a trigger information field carries instruction information for the AP instructing the non-AP STA to send service stream data which is transmitted in a non-competitive manner.

Optionally, transmitting, by the non-AP STA, data to the AP according to the trigger frame or the radio frame carrying a trigger information field, includes: when an AC is designated in the trigger frame or the radio frame carrying a trigger information field, transmitting, by the non-AP STA, data corresponding to the designated AC; or when an AC is designated in the trigger frame or the radio frame carrying a trigger information field, transmitting, by the non-AP STA, data corresponding to an AC of a priority level equal to or higher than a priority level of the designated AC; or when an AC is designated in the trigger frame or the radio frame carrying a trigger information field, transmitting, by the non-AP STA, data of any AC, at least including data corresponding to the designated AC; or when an AC is or is not designated in the trigger frame or the radio frame carrying a trigger information field, transmitting, by the non-AP STA, data of any AC; or when an AC is designated in the trigger frame or the radio frame carrying a trigger information field, no data to be transmitted exists in the designated AC of the non-AP STA, and when data to be transmitted exists in a buffer queue of other AC of the non-AP STA, transmitting, by the non-AP STA, data corresponding to said other AC, and when no data to be transmitted exists in a buffer queue of any AC of the non-AP STA, transmitting, by the non-AP STA, service stream data which is transmitted in a non-competitive manner; or when an AC is designated in the trigger frame or the radio frame carrying a trigger information field, by default, transmitting, by the non-AP STA, at least service stream data which is transmitted in a non-competitive manner; or when an AC is designated in the trigger frame or the radio frame carrying a trigger information field, by default, always allowing the non-AP STA to transmit service stream data which is transmitted in a non-competitive manner; or when an AC is designated in the trigger frame or the radio frame carrying a trigger information field, transmitting in top priority, by the non-AP STA, data corresponding to the designated AC; wherein when a total length of data to be transmitted in a buffer queue of the designated AC does not reach a designated length of an uplink data packet, the non-AP STA transmits data of other AC and/or transmits service stream data which is transmitted in a non-competitive manner.

Optionally, the method further includes: when it is designated in the trigger frame or the radio frame carrying a trigger information field to transmit service stream data which is transmitted in a non-competitive manner, transmitting, by the non-AP STA, service stream data which is transmitted in a non-competitive manner.

Optionally, transmitting, by the non-AP STA, service stream data which is transmitted in a non-competitive manner, includes: when no service stream data which is transmitted in a non-competitive manner exists for the non-AP STA, transmitting, by the non-AP STA, data of any AC.

Optionally, the data contains a length parameter of a buffer queue of at least one AC of the non-AP STA.

Optionally, the non-AP STA reports to the AP a length of a buffer queue of service stream which is transmitted in a non-competitive manner.

Optionally, the method further includes: when the non-AP STA does not receive the trigger frame or the radio frame carrying a trigger information field for a predetermined time period, transmitting, by the non-AP STA, service stream data which is transmitted in a non-competitive manner through any transmitting opportunity obtained by any AC in competition.

According to another aspect of the present disclosure, there is provided yet another method for competitive transmission, including: receiving, by a non-access-point station (non-AP STA), a trigger frame or a radio frame carrying a trigger information field sent by an access point (AP); and transmitting, by the non-AP STA, data to the AP according to the trigger frame or the radio frame carrying a trigger information field, wherein the trigger frame or the radio frame carrying a trigger information field carries an access category designated by the AP for at least one non-AP STA to transmit data of that access category in uplink multi-user (UL MU) transmission; or the trigger frame or the radio frame carrying a trigger information field carries instruction information for the AP instructing the non-AP STA to send service stream data which is transmitted in a non-competitive manner.

Optionally, the method further includes: resetting, by the non-AP STA, a contention window (CW) of an access category (AC) corresponding to the data to an initial value, upon receiving a response message from the AP; and setting to zero, by the non-AP STA, a Backoff timer of the AC corresponding to the data.

Optionally, transmitting, by the non-AP STA, data to the AP according to the trigger frame or the radio frame carrying a trigger information field, includes: when an AC is designated in the trigger frame or the radio frame carrying a trigger information field, transmitting, by the non-AP STA, data corresponding to the designated AC; or when an AC is designated in the trigger frame or the radio frame carrying a trigger information field, transmitting, by the non-AP STA, data corresponding to an AC of a priority level equal to or higher than a priority level of the designated AC; or when an AC is designated in the trigger frame or the radio frame carrying a trigger information field, transmitting, by the non-AP STA, data of any AC, at least including data corresponding to the designated AC; or when an AC is or is not designated in the trigger frame or the radio frame carrying a trigger information field, transmitting, by the non-AP STA, data of any AC; or when an AC is designated in the trigger frame or the radio frame carrying a trigger information field, no data to be transmitted exists in the designated AC of the non-AP STA, and when data to be transmitted exists in a buffer queue of other AC of the non-AP STA, transmitting, by the non-AP STA, data corresponding to said other AC, and when no data to be transmitted exists in a buffer queue of any AC of the non-AP STA, transmitting, by the non-AP STA, service stream data which is transmitted in a non-competitive manner; or when an AC is designated in the trigger frame or the radio frame carrying a trigger information field, by default, transmitting, by the non-AP STA, at least service stream data which is transmitted in a non-competitive manner; or when an AC is designated in the trigger frame or the radio frame carrying a trigger information field, by default, always allowing the non-AP STA to transmit service stream data which is transmitted in a non-competitive manner; or when an AC is designated in the trigger frame or the radio frame carrying a trigger information field, transmitting in top priority, by the non-AP STA, data corresponding to the designated AC; wherein when a total length of data to be transmitted in a buffer queue of the designated AC does not reach a designated length of an uplink data packet, the non-AP STA transmits data of other AC and/or transmits service stream data which is transmitted in a non-competitive manner.

Optionally, the method further includes: when it is designated in the trigger frame or the radio frame carrying a trigger information field to transmit service stream data which is transmitted in a non-competitive manner, transmitting, by the non-AP STA, service stream data which is transmitted in a non-competitive manner.

Optionally, transmitting, by the non-AP STA, service stream data which is transmitted in a non-competitive manner, includes: when no service stream data which is transmitted in a non-competitive manner exists for the non-AP STA, transmitting, by the non-AP STA, data of any AC.

Optionally, the data contains a length parameter of a buffer queue of at least one AC of the non-AP STA.

Optionally, the non-AP STA reports to the AP a length of a buffer queue of service stream which is transmitted in a non-competitive manner.

Optionally, the method further includes: when the non-AP STA does not receive the trigger frame or the radio frame carrying a trigger information field for a predetermined time period, transmitting, by the non-AP STA, service stream data which is transmitted in a non-competitive manner through any transmitting opportunity obtained by any AC in competition.

According to one aspect of the present disclosure, there is also provided a device for competitive transmission, applied in an access point (AP), and the device including: a sending module configured to send a trigger frame or a radio frame carrying a trigger information field to at least one non-AP station (non-AP STA), to trigger the at least one non-AP STA to perform uplink multi-user (UL MU) transmission; and a setup module configured to reset a contention window (CW) of an access category (AC) to an initial value when data transmitted by the at least one non-AP STA is received.

Optionally, the AC refers to an access category designated by the AP in the trigger frame or the radio frame carrying a trigger information field, for the at least one non-AP STA to transmit data of that access category in the UL MU transmission.

Optionally, the device further includes: a first adjustment module configured to adjust a length parameter of a buffer queue of the AC corresponding to the data.

Optionally, the device further includes: a second adjustment module configured to, when the data contains a length parameter of a buffer queue of at least one AC of the at least one non-AP STA, adjust a length parameter of a buffer queue of at least one AC at the AP side according to the length parameter of the buffer queue of the at least one AC.

Optionally, the trigger frame or the radio frame carrying a trigger information field carries instruction information for instructing the non-AP STA to send service stream data which is transmitted in a non-competitive manner.

According to one aspect of the present disclosure, there is also provided yet another device for competitive transmission, applied in an access point (AP), and the device including: a sending module configured to send a trigger frame or a radio frame carrying a trigger information field to at least one non-AP station (non-AP STA), to trigger the at least one non-AP STA to perform uplink multi-user (UL MU) transmission; wherein the AP designates in the trigger frame or the radio frame carrying a trigger information field an AC for the at least one non-AP STA to transmit data of that access category in the UL MU transmission; or the AP designates in the trigger frame or the radio frame carrying a trigger information field instruction information for instructing the at least one non-AP STA to send service stream data which is transmitted in a non-competitive manner.

Optionally, the above device further includes a setup module configured to reset a contention window (CW) of an access category (AC) to an initial value when data transmitted by the at least one non-AP STA is received.

Optionally, the device further includes: a first adjustment module configured to adjust a length parameter of a buffer queue of the AC corresponding to the data.

Optionally, the device further includes: a second adjustment module configured to, when the data contains a length parameter of a buffer queue of at least one AC of the at least one non-AP STA, adjust a length parameter of a buffer queue of at least one AC at the AP side according to the length parameter of the buffer queue of the at least one AC.

According to another aspect of the present disclosure, there is also provided another device for competitive transmission, applied in a non-access-point station (non-AP STA), and the device including: a receiving module configured to receive a trigger frame or a radio frame carrying a trigger information field sent by an access point (AP); a first sending module configured to transmit data to the AP according to the trigger frame or the radio frame carrying a trigger information field; a setup module configured to reset a contention window (CW) of an access category (AC) corresponding to the data to an initial value, when a response message from the AP is received; and a zero clearing module configured to set to zero a Backoff timer of the AC corresponding to the data.

Optionally, the trigger frame or the radio frame carrying a trigger information field carries an access category designated by the AP for at least one non-AP STA to transmit data of that access category in uplink multi-user (UL MU) transmission; or the trigger frame or the radio frame carrying a trigger information field carries instruction information for the AP instructing the non-AP STA to send service stream data which is transmitted in a non-competitive manner.

Optionally, the first sending module includes: a first sending unit configured to, when an AC is designated in the trigger frame or the radio frame carrying a trigger information field, transmit data corresponding to the designated AC; or when an AC is designated in the trigger frame or the radio frame carrying a trigger information field, transmit, by the non-AP STA, data corresponding to an AC of a priority level equal to or higher than a priority level of the designated AC; or when an AC is designated in the trigger frame or the radio frame carrying a trigger information field, transmit, by the non-AP STA, data of any AC, at least including data corresponding to the designated AC; or a second sending unit configured to, when an AC is or is not designated in the trigger frame or the radio frame carrying a trigger information field, transmit data of any AC; or a third sending unit configured to, when an AC is designated in the trigger frame or the radio frame carrying a trigger information field, no data to be transmitted exists in the designated AC of the non-AP STA, and when data to be transmitted exists in a buffer queue of other AC of the non-AP STA, transmit, by the non-AP STA, data corresponding to said other AC, and when no data to be transmitted exists in a buffer queue of any AC of the non-AP STA, transmit service stream data which is transmitted in a non-competitive manner; or when an AC is designated in the trigger frame or the radio frame carrying a trigger information field, by default, transmit, by the non-AP STA, at least service stream data which is transmitted in a non-competitive manner; or a fourth sending unit configured to, when an AC is designated in the trigger frame or the radio frame carrying a trigger information field, by default, always transmit service stream data which is transmitted in a non-competitive manner; or a fifth sending unit configured to, when an AC is designated in the trigger frame or the radio frame carrying a trigger information field, transmit in top priority data corresponding to the designated AC; wherein when a total length of data to be transmitted in a buffer queue of the designated AC does not reach a designated length of an uplink data packet, the non-AP STA transmits data of other AC and/or transmits service stream data which is transmitted in a non-competitive manner.

Optionally, the device further includes: a second sending module configured to, when it is designated in the trigger frame or the radio frame carrying a trigger information field to transmit service stream data which is transmitted in a non-competitive manner, transmit, by the non-AP STA, service stream data which is transmitted in a non-competitive manner.

Optionally, the second sending module is further configured to: when no service stream data which is transmitted in a non-competitive manner exists for the non-AP STA, transmit data in a queue of any AC.

Optionally, the data contains a length parameter of a buffer queue of at least AC of the non-AP STA.

Optionally, the device further includes: a third sending module configured to report to the AP a length of a buffer queue of service stream which is transmitted in a non-competitive manner.

Optionally, the device further includes: a fourth sending module configured to, when the non-AP STA does not receive the trigger frame or the radio frame carrying a trigger information field for a predetermined time period, transmit service stream data which is transmitted in a non-competitive manner through any transmitting opportunity obtained by any AC in competition.

According to another aspect of the present disclosure, there is also provided yet another device for competitive transmission, applied in a non-access-point station (non-AP STA), and the device including: a receiving module configured to receive a trigger frame or a radio frame carrying a trigger information field sent by an access point (AP); and a first sending module configured to transmit data to the AP according to the trigger frame or the radio frame carrying a trigger information field; wherein the trigger frame or the radio frame carrying a trigger information field carries an access category designated by the AP for at least one non-AP STA to transmit data of that access category in uplink multi-user (UL MU) transmission; or the trigger frame or the radio frame carrying a trigger information field carries instruction information for the AP instructing the non-AP STA to send service stream data which is transmitted in a non-competitive manner.

Optionally, the device further includes: a setup module configured to reset a contention window (CW) of an access category (AC) corresponding to the data to an initial value, when a response message from the AP is received; and a zero clearing module configured to set to zero a Backoff timer of the AC corresponding to the data.

Optionally, the first sending module includes: a first sending unit configured to, when an AC is designated in the trigger frame or the radio frame carrying a trigger information field, transmit data corresponding to the designated AC; or when an AC is designated in the trigger frame or the radio frame carrying a trigger information field, transmit, by the non-AP STA, data corresponding to an AC of a priority level equal to or higher than a priority level of the designated AC; or when an AC is designated in the trigger frame or the radio frame carrying a trigger information field, transmit, by the non-AP STA, data of any AC, at least including data corresponding to the designated AC; or a second sending unit configured to, when an AC is or is not designated in the trigger frame or the radio frame carrying a trigger information field, transmit data of any AC; or a third sending unit configured to, when an AC is designated in the trigger frame or the radio frame carrying a trigger information field, no data to be transmitted exists in the designated AC of the non-AP STA, and when data to be transmitted exists in a buffer queue of other AC of the non-AP STA, transmit, by the non-AP STA, data corresponding to said other AC, and when no data to be transmitted exists in a buffer queue of any AC of the non-AP STA, transmit service stream data which is transmitted in a non-competitive manner; or when an AC is designated in the trigger frame or the radio frame carrying a trigger information field, by default, transmit, by the non-AP STA, at least service stream data which is transmitted in a non-competitive manner; or a fourth sending unit configured to, when an AC is designated in the trigger frame or the radio frame carrying a trigger information field, by default, always transmit service stream data which is transmitted in a non-competitive manner; or a fifth sending unit configured to, when an AC is designated in the trigger frame or the radio frame carrying a trigger information field, transmit in top priority data corresponding to the designated AC; wherein when a total length of data to be transmitted in a buffer queue of the designated AC does not reach a designated length of an uplink data packet, the non-AP STA transmits data of other AC and/or transmits service stream data which is transmitted in a non-competitive manner.

Optionally, the device further includes: a second sending module configured to, when it is designated in the trigger frame or the radio frame carrying a trigger information field to transmit service stream data which is transmitted in a non-competitive manner, transmit, by the non-AP STA, service stream data which is transmitted in a non-competitive manner.

Optionally, the second sending module is further configured to: when no service stream data which is transmitted in a non-competitive manner exists for the non-AP STA, transmit data in a queue of any AC.

Optionally, the data contains a length parameter of a buffer queue of at least AC of the non-AP STA.

Optionally, the device further includes: a third sending module configured to report to the AP a length of a buffer queue of service stream which is transmitted in a non-competitive manner.

Optionally, the device further includes: a fourth sending module configured to, when the non-AP STA does not receive the trigger frame or the radio frame carrying a trigger information field for a predetermined time period, transmit service stream data which is transmitted in a non-competitive manner through any transmitting opportunity obtained by any AC in competition.

According to another aspect of the present disclosure, there is also provided a device for competitive transmission, applied in an access point (AP), including a processor and a memory. The memory stores instructions executable by the processor. The processor is configured to perform: sending, by an access point (AP), a trigger frame or a radio frame carrying a trigger information field to at least one non-AP station (non-AP STA), to trigger the at least one non-AP STA to perform uplink multi-user (UL MU) transmission; and resetting, by the AP, a contention window (CW) of an access category (AC) to an initial value upon receiving data transmitted by the at least one non-AP STA.

According to another aspect of the present disclosure, there is also provided a a device for competitive transmission, applied in an non-access-point station (non-AP STA), including a processor and a memory. The memory stores instructions executable by the processor. The processor is configured to perform: receiving, by a non-access-point station (non-AP STA), a trigger frame or a radio frame carrying a trigger information field sent by an access point (AP); transmitting, by the non-AP STA, data to the AP according to the trigger frame or the radio frame carrying a trigger information field; resetting, by the non-AP STA, a contention window (CW) of an access category (AC) corresponding to the data to an initial value, upon receiving a response message from the AP; and setting to zero, by the non-AP STA, a Backoff timer of the AC corresponding to the data.

According to another aspect of the present disclosure, there is also provided a computer storage medium storing executable instructions for implementing the methods according to the above embodiments.

According to the present disclosure, after an AP receives the data sent from the non-AP STAs, the CW of the AC is reset to an initial value, and the AP resets to zero a Backoff timer of the AC. In this way, it can solve the problem in the related art as how to set the competition parameters at the AP side and the non-AP station side, after a trigger frame is sent in a competitive manner, and can ensure that the competition parameters of the same queue at the AP side and the non-AP station are kept in synchronization. Moreover, it may present the busy and idle states of the channel.

This section provides a summary of various implementations or examples of the technology described in the disclosure, and is not a comprehensive disclosure of the full scope or all features of the disclosed technology.

BRIEF DESCRIPTION OF THE DRAWINGS

The drawings described herein are used to provide a further understanding of the present disclosure and constitute a part of the present application. The schematic embodiments and the descriptions thereof in the present disclosure are used to explain the present disclosure, and do not constitute improper limitations to the present disclosure. In the drawings.

DETAILED DESCRIPTION

Hereinafter, the present disclosure will be described in detail with reference to the accompanying drawings and embodiments. It should be noted that, the embodiments and the features in the embodiments in the present application may be combined with each other without conflict.

Figure 1:
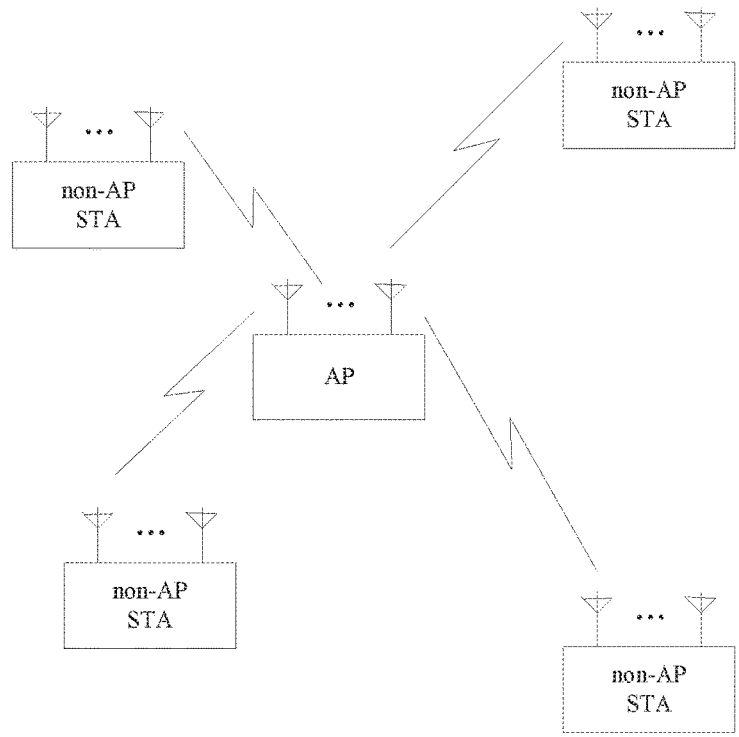
FIG. 1 is a diagram illustrating an example of a WLAN basic service set BSS.
Figure 2:
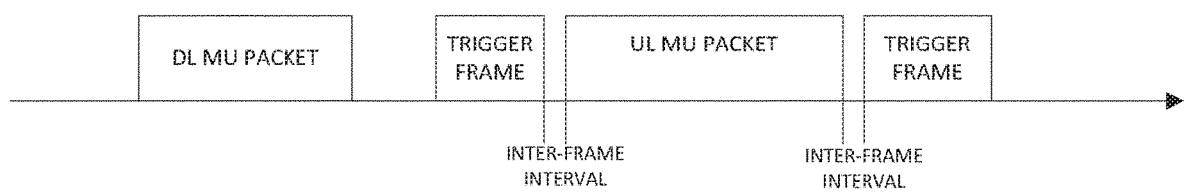
FIG. 2 is a diagram illustrating an example of a frame exchange process for an AP triggering a UL MU transmission.
Figure 3:
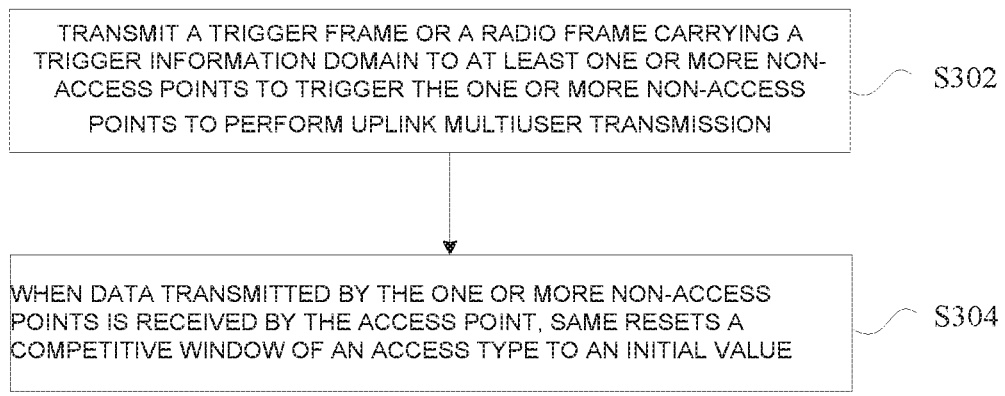
FIG. 3 is a flow chart illustrating a method for competitive transmission according to an embodiment of the present disclosure.

An embodiment provides a method for competitive transmission. FIG. 3 is a flow chart illustrating a method for competitive transmission according to an embodiment of the present disclosure. As shown in FIG. 3, the method includes the following steps.

In step S302, a trigger frame or a radio frame carrying a trigger information field is sent to one or more non-AP STAs, to trigger the one or more non-AP STAs to perform UL MU transmission.

In step S304, after an AP receives data sent from the one or more non-AP STAs, a CW of an AC is reset to an initial value.

Through the above steps, after an AP receives the data sent from the non-AP STAs, the CW of the AC is reset to an initial value. In this way, it can solve the problem in the related art as how to set the competition parameters at the AP side and the non-AP station side, after a trigger frame is sent in a competitive manner, and can ensure that the competition parameters of the same queue at the AP side and the non-AP station side are kept in synchronization. Moreover, it may present the busy and idle states of the channel.

In one optional embodiment, before the AP receives the data sent from the non-AP STAs, the AP sends the trigger frame or the radio frame carrying a trigger information field to the one or more non-AP STAs, to facilitate the non-AP STAs to send data to the AP according to the trigger frame or the radio frame carrying a trigger information field. The trigger frame or the radio frame carrying a trigger information field carries scheduling information of the one or more non-AP STAs, and both of the trigger frame and the radio frame carrying a trigger information field are for triggering the one or more non-AP STAs to perform UL MU transmission.

In an optional embodiment, the above AC refers to an access category designated by the AP in the trigger frame or the radio frame carrying a trigger information field, for the one or more non-AP STAs to transmit data of that access category in the UL MU transmission.

In an optional embodiment, after the AP receives the data, a length parameter of a buffer queue of the AC corresponding to the data is adjusted.

In another optional embodiment, when the above data contains length parameters of buffer queues of one or more ACs of the non-AP STAs, the AP adjusts the length parameters of buffer queues of one or more ACs at the AP side according to the length parameters of the buffer queues of the one or more ACs.

Optionally, the trigger frame or the radio frame carrying a trigger information field carries instruction information for instructing the non-AP STAs to send service stream data which is transmitted in a non-competitive manner.

An embodiment of the present disclosure also provides another method for competitive transmission. The method includes the following steps. A trigger frame or a radio frame carrying a trigger information field is sent to one or more non-AP STAs, to trigger the one or more non-AP STAs to perform UL MU transmission. The above AP designates an access category in the trigger frame or the radio frame carrying a trigger information field, for the one or more non-AP STAs to transmit data of that access category in the UL MU transmission. Optionally, the AP causes the trigger frame or the radio frame carrying a trigger information field to carry instruction information for instructing the non-AP STAs to send service stream data which is transmitted in a non-competitive manner.

Optionally, the above another method for competitive transmission also includes the following steps. After the AP receives data sent from the one or more non-AP STAs, a CW of an AC is reset to an initial value.

Optionally, the above another method for competitive transmission also includes the following steps. After the AP receives the above data, the AP adjusts a length parameter of a buffer queue of the AC corresponding to the data.

Optionally, in the above another method for competitive transmission, when the above data contains length parameters of buffer queues of one or more ACs of one or more non-AP STAs, the AP adjusts the length parameters of buffer queues of one or more ACs at the AP according to the length parameters of the buffer queues of the one or more ACs.

Figure 4:
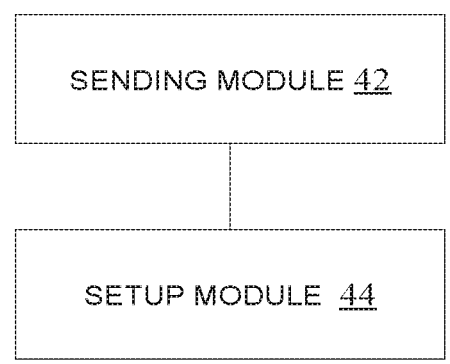
FIG. 4 is a block diagram illustrating a device for competitive transmission according to an embodiment of the present disclosure.

In an embodiment, there is also provides a device for competitive transmission, for implementing the above embodiments and optional embodiments. The same description will not be repeated herein. As used herein, the term "module" refers to combination of software and/or hardware that achieves a predetermined function. Although the devices described in the following embodiments are preferably implemented in software, the implementation of hardware or a combination of software and hardware is also possible and contemplated. FIG. 4 is a block diagram illustrating a device for competitive transmission according to an embodiment of the present disclosure, which is applied to an AP. As shown in FIG. 4, the device includes: a sending module 42 configured to send a trigger frame or a radio frame carrying a trigger information field to one or more non-AP STAs, to trigger the one or more non-AP STAs to perform UL MU transmission; and a setup module 44 configured to, after the AP receives data sent from the one or more non-AP STAs, reset a CW of an AC to an initial value.

Optionally, the AC refers to an access category designated by the AP in the trigger frame or the radio frame carrying a trigger information field, for the one or more non-AP STAs to transmit data of that access category in the UL MU transmission.

Figure 5:
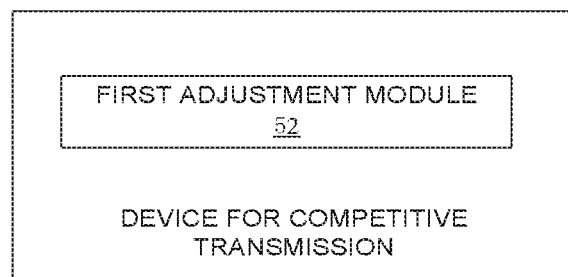
FIG. 5 is a first block diagram illustrating a device for competitive transmission according to an embodiment of the present disclosure.

FIG. 5 is a first block diagram illustrating a device for competitive transmission according to an embodiment of the present disclosure. As shown in FIG. 5, the device further includes: a first adjustment module 52 configured to adjust a length parameter of a buffer queue of the AC corresponding to the data.

Figure 6:
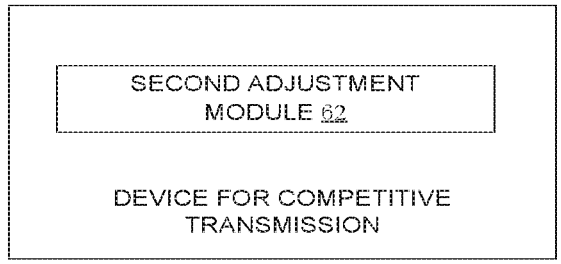
FIG. 6 is a second block diagram illustrating a device for competitive transmission according to an embodiment of the present disclosure.

FIG. 6 is a second block diagram illustrating a device for competitive transmission according to an embodiment of the present disclosure. The device further includes: a second adjustment module 62 configured for, when the above data contains length parameters of buffer queues of one or more ACs of the non-AP STAs, the AP to adjust the length parameters of buffer queues of one or more ACs at the AP side according to the length parameters of the buffer queues of the one or more ACs.

Optionally, the trigger frame or the radio frame carrying a trigger information field carries instruction information for instructing the non-AP STAs to send service stream data which is transmitted in a non-competitive manner.

An embodiment of the present disclosure also provides another device for competitive transmission. Said another device for competitive transmission is applied in an AP, and includes the above sending module. The sending module is configured to send a trigger frame or a radio frame carrying a trigger information field to one or more non-AP STAs, to trigger the one or more non-AP STAs to perform UL MU transmission. The AP designates an access category in the trigger frame or the radio frame carrying a trigger information field, for the one or more non-AP STAs to transmit data of that access category in the UL MU transmission. Optionally, the AP causes the trigger frame or the radio frame carrying a trigger information field to carry instruction information for instructing the non-AP STAs to send service stream data which is transmitted in a non-competitive manner.

Optionally, said another device for competitive transmission further includes the above setup module configured to, after data sent from the one or more non-AP STAs is received, reset a CW of an AC to an initial value.

Optionally, said another device for competitive transmission further includes the above first adjustment module, configured to adjust a length parameter of a buffer queue of the AC corresponding to the data.

Optionally, said another device for competitive transmission further includes the above second adjustment module, configured for, when the data contains length parameters of buffer queues of one or more ACs of the non-AP STAs, the AP to adjust the length parameters of buffer queues of one or more ACs at the AP side according to the length parameters of the buffer queues of the one or more ACs.

It should be noted that, each of the above modules may be implemented by software or hardware. When implemented by hardware, the above modules may be implemented by, but not limited to, the following manners. The above modules are disposed in the same processor; optionally, the above modules are respectively disposed in a first processor, a second processor, a third processes, and so on.

Figure 7:
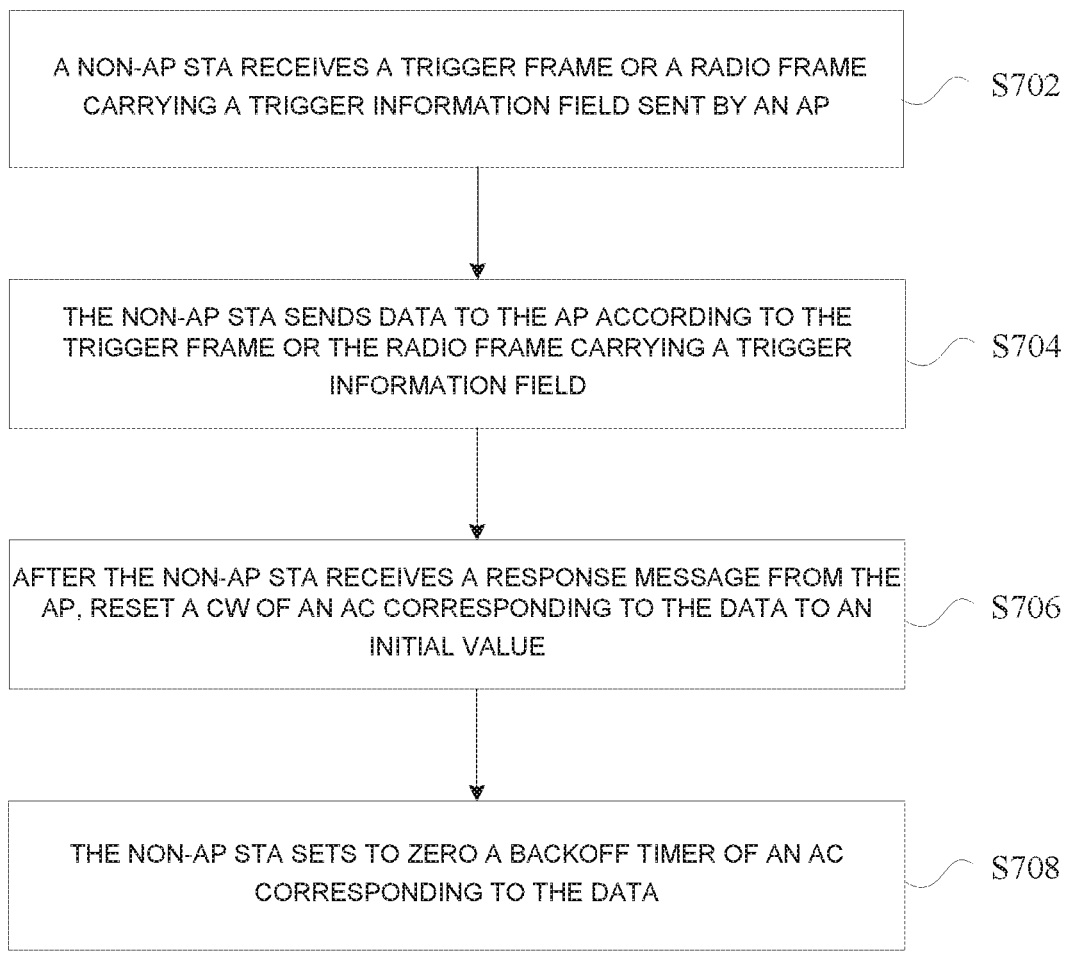
FIG. 7 is a first flow chart illustrating a method for competitive transmission according to an embodiment of the present disclosure.

In another embodiment, there is also provided another method for competitive transmission. FIG. 7 is a first flow chart illustrating a method for competitive transmission according to an embodiment of the present disclosure. As shown in FIG. 7, the method includes the following steps.

In step S702, a non-AP STA receives a trigger frame or a radio frame carrying a trigger information field sent by an AP.

In step S704, the non-AP STA sends data to the AP according to the trigger frame or the radio frame carrying a trigger information field.

In step S706, after the non-AP STA receives a response message from the AP, a CW of an AC corresponding to the data is reset to an initial value.

In step S708, the non-AP STA sets to zero a Backoff timer of an AC corresponding to the data.

Through the above steps, after the non-AP STA receives the response message sent by the AP, the non-AP STA resets the CW of the AC to an initial value, and sets to zero the Backoff timer of the AC. It can solve the problem in the related art as how to set the competition parameters at the AP side and the non-AP station side, after a trigger frame is sent in a competitive manner, and can ensure that the competition parameters of the same queue at the AP side and the non-AP station side are kept in synchronization. Moreover, it may present the busy and idle states of the channel. It should be noted that, the above steps S706 and S708 are not restricted by a definite order.

In an optional embodiment, the above trigger frame or the radio frame carrying a trigger information field carries an access category designated by the AP for the one or more non-AP STAs to transmit data of that access category in the UL MU transmission. Optionally, the trigger frame or the radio frame carrying a trigger information field carries instruction information for the AP instructing the non-AP STA to send service stream data which is transmitted in a non-competitive manner.

The above step S704 relates to the non-AP STA sending data to the AP according to the trigger frame or the radio frame carrying a trigger information field. In an optical embodiment, when an AC is designated in the trigger frame or the radio frame carrying a trigger information field, the non-AP STA sends data corresponding to the designated AC. Optionally, when an AC is designated in the trigger frame or the radio frame carrying a trigger information field, the non-AP STA sends data corresponding to an AC of a priority level equal to or higher than the designated AC. Optionally, when an AC is designated in the trigger frame or the radio frame carrying a trigger information field, the non-AP STA sends data corresponding to any AC, at least including data corresponding to the designated AC. In another optional embodiment, when an AC is or is not designated in the trigger frame or the radio frame carrying a trigger information field (that is, irrelevant whether an AC is designated in the trigger frame or the radio frame carrying a trigger information field), the non-AP STA sends data corresponding to any AC. In yet another optional embodiment, optionally, when an AC is designated in the trigger frame or the radio frame carrying a trigger information field, there is no data corresponding to the designated AC of the non-AP STA which is waiting to be transmitted, and when there is data to be transmitted in a buffer queue of other AC of the non-AP STA, the non-AP STA sends the data corresponding to the other AC, and when there is no data to be transmitted in a buffer queue of any AC of the non-AP STA (that is, there is no data to be transmitted in a buffer queue of any of the ACs of the non-AP STA), the non-AP STA sends service stream data which is transmitted in a non-competitive manner. Optionally, when an AC is designated in the trigger frame or the radio frame carrying a trigger information field, by default, the non-AP STA at least sends service stream data which is transmitted in a non-competitive manner. Optionally, when an AC is designated in the trigger frame or the radio frame carrying a trigger information field, by default, the non-AP STA may always send service stream data which is transmitted in a non-competitive manner by default. Optionally, when an AC is designated in the trigger frame or the radio frame carrying a trigger information field, the non-AP STA sends in top priority data corresponding to the designated AC. When a total length of the data to be transmitted in the buffer queue of the designated AC does not reach a designated length of an uplink data packet, the non-AP STA sends data of other AC and/or sends service stream data which is transmitted in a non-competitive manner.

In an optional embodiment, when it is designated in the trigger frame or the radio frame carrying a trigger information field to transmit service stream data which is transmitted in a non-competitive manner, the non-AP STA transmits service stream data which is transmitted in a non-competitive manner.

In an optional embodiment, while the non-AP STA is transmitting the data which is transmitted in a non-competitive manner, when there is no service stream data which is transmitted in a non-competitive manner for the non-AP STA to transmit, the non-AP STA sends data in a queue of any AC.

In an optional embodiment, the above data contains a length of a buffer queue of each of the one or more ACs of the non-AP STA.

In an optional embodiment, the non-AP STA reports to the AP a length of the buffer queue of the service stream which is transmitted in a non-competitive manner.

In an optional embodiment, when the non-AP STA does not receive the trigger frame or the radio frame carrying a trigger information field for a predetermined time period, the non-AP STA sends the service stream data which is transmitted in a non-competitive manner through any transmitting opportunity obtained by any AC in competition.

In an embodiment of the present disclosure, there is also provided yet another method for competitive transmission. The method includes the following steps. The non-AP STA receives a trigger frame or a radio frame carrying a trigger information field sent by the AP. The non-AP STA sends data to the AP according to the trigger frame or the radio frame carrying a trigger information field. The trigger frame or the radio frame carrying a trigger information field carries an AC designated by the AP for the one or more non-AP STAs to transmit data of that access category in the UL MU transmission. Optionally, the trigger frame or the radio frame carrying a trigger information field carries instruction information for the AP instructing the non-AP STAs to send service stream data which is transmitted in a non-competitive manner.

Optionally, the above yet another method for competitive transmission further includes the following steps. After the non-AP STA receives a response message from the AP, the CW of the AC corresponding to the data is reset to an initial value. The non-AP STA sets to zero a Backoff timer of an AC corresponding to the data.

Optionally, in the above yet another method for competitive transmission, the non-AP STA sending data to the AP according to the trigger frame or the radio frame carrying a trigger information field includes the following steps. When an AC is designated in the trigger frame or the radio frame carrying a trigger information field, the non-AP STA sends data corresponding to the designated AC. Optionally, when an AC is designated in the trigger frame or the radio frame carrying a trigger information field, the non-AP STA sends data corresponding to an AC of a priority level equal to or higher than the designated AC. Optionally, when an AC is designated in the trigger frame or the radio frame carrying a trigger information field, the non-AP STA sends data corresponding to any AC, at least including data corresponding to the designated AC. In another optional embodiment, when an AC is or is not designated in the trigger frame or the radio frame carrying a trigger information field (that is, irrelevant whether an AC is designated in the trigger frame or the radio frame carrying a trigger information field), the non-AP STA sends data corresponding to any AC. In yet another optional embodiment, optionally, when an AC is designated in the trigger frame or the radio frame carrying a trigger information field, there is no data corresponding to the designated AC of the non-AP STA which is waiting to be transmitted, and when there is data to be transmitted in a buffer queue of other AC of the non-AP STA, the non-AP STA sends the data corresponding to the other AC, and when there is no data to be transmitted in a buffer queue of any AC of the non-AP STA (that is, there is no data to be transmitted in a buffer queue of any of the ACs of the non-AP STA), the non-AP STA sends service stream data which is transmitted in a non-competitive manner. Optionally, when an AC is designated in the trigger frame or the radio frame carrying a trigger information field, by default, the non-AP STA at least sends service stream data which is transmitted in a non-competitive manner. Optionally, when an AC is designated in the trigger frame or the radio frame carrying a trigger information field, by default, the non-AP STA may always send service stream data which is transmitted in a non-competitive manner by default. Optionally, when an AC is designated in the trigger frame or the radio frame carrying a trigger information field, the non-AP STA sends in top priority data corresponding to the designated AC. When a total length of the data to be transmitted in the buffer queue of the designated AC does not reach a designated length of an uplink data packet, the non-AP STA sends data of other AC and/or sends service stream data which is transmitted in a non-competitive manner.

Optionally, the above yet another method for competitive transmission also includes: when it is designated in the trigger frame or the radio frame carrying a trigger information field to transmit service stream data which is transmitted in a non-competitive manner, the non-AP STA transmits service stream data which is transmitted in a non-competitive manner.

Optionally, in the above yet another method for competitive transmission, the non-AP STA transmitting service stream data which is transmitted in a non-competitive manner also includes: when there is no service stream data which is transmitted in a non-competitive manner for the non-AP STA to transmit, the non-AP STA sends data of any AC.

Optionally, in the above yet another method for competitive transmission, the above data contains a length parameter of a buffer queue of each of the one or more ACs of the non-AP STA.

Optionally, in the above yet another method for competitive transmission, the non-AP STA reports to the AP a length of the buffer queue of the service stream which is transmitted in a non-competitive manner.

Optionally, the above yet another method for competitive transmission further includes: when the non-AP STA does not receive the trigger frame or the radio frame carrying a trigger information field for a predetermined time period, the non-AP STA sends the service stream data which is transmitted in a non-competitive manner through any transmitting opportunity obtained by any AC in competition.

In an embodiment, there is also provided another device for competitive transmission, for implementing the above embodiments and optional embodiments. The same description will not be repeated herein. As used herein, the term "module" refers to combination of software and/or hardware that achieves a predetermined function. Although the devices described in the following embodiments are preferably implemented in software, the implementation of hardware or a combination of software and hardware is also possible and contemplated.

Figure 8:
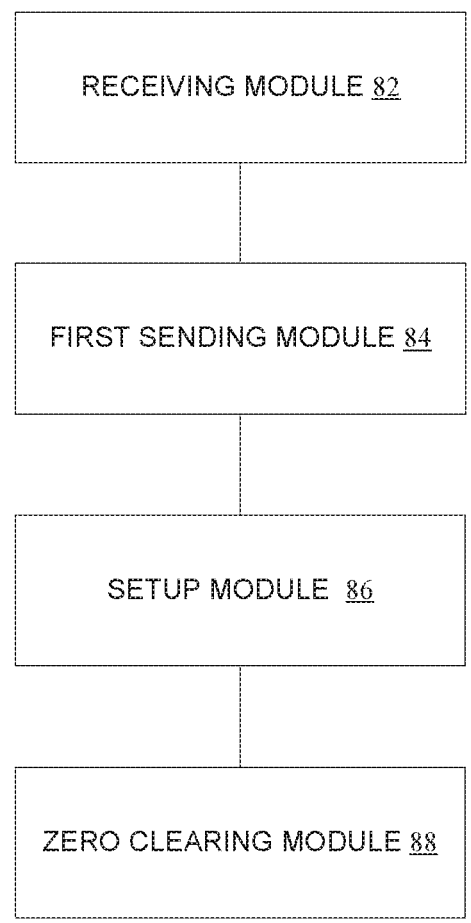
FIG. 8 is a third block diagram illustrating a device for competitive transmission according to an embodiment of the present disclosure.

FIG. 8 is a third block diagram illustrating a device for competitive transmission according to an embodiment of the present disclosure, which is applied in a non-AP STA. As shown in FIG. 8, the device includes: a receiving module 82 configured to receive a trigger frame or a radio frame carrying a trigger information field sent by an AP; a first sending module 84 configured to send data to the AP according to the trigger frame or the radio frame carrying a trigger information field; a setup module 86 configured to, when a response message is received from the AP, reset a CW of an AC corresponding to the data to an initial value; and a zero clearing module 88 configured set to zero a Backoff timer of an AC corresponding to the data.

In an optional embodiment, the above trigger frame or the radio frame carrying a trigger information field carries an access category designated by the AP for the one or more non-AP STAs to transmit data of that access category in the UL MU transmission. Optionally, the trigger frame or the radio frame carrying a trigger information field carries instruction information for the AP instructing the non-AP STA to send service stream data which is transmitted in a non-competitive manner.

Figure 9:
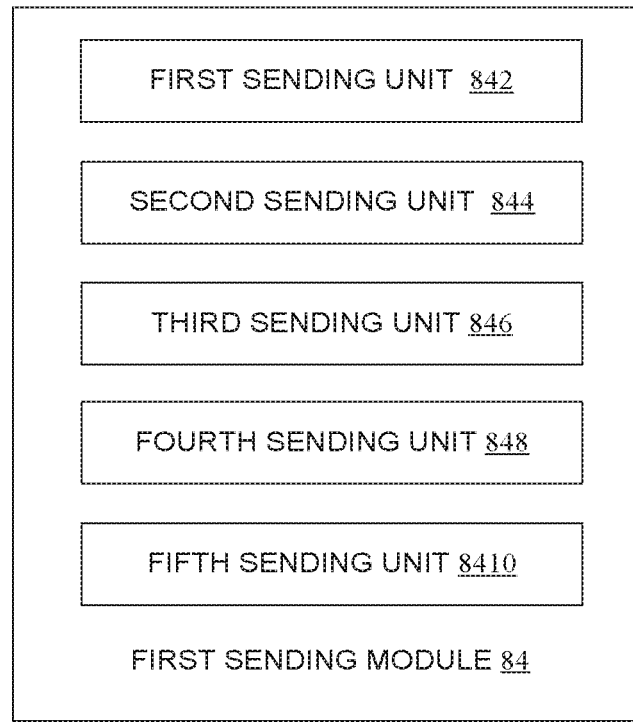
FIG. 9 is a fourth block diagram illustrating a device for competitive transmission according to an embodiment of the present disclosure.

FIG. 9 is a fourth block diagram illustrating a device for competitive transmission according to an embodiment of the present disclosure. As shown in FIG. 9, the first sending module 84 includes a first sending unit 842 configured to, when an AC is designated in the trigger frame or the radio frame carrying a trigger information field, send data corresponding to the designated AC; or, when an AC is designated in the trigger frame or the radio frame carrying a trigger information field, send, by the non-AP STA, data corresponding to an AC of a priority level equal to or higher than the designated AC; or when an AC is designated in the trigger frame or the radio frame carrying a trigger information field, send, by the non-AP STA, data corresponding to any AC, at least including data corresponding to the designated AC; or a second sending unit 844 configured to, when an AC is or is not designated in the trigger frame or the radio frame carrying a trigger information field (that is, irrelevant whether an AC is designated in the trigger frame or the radio frame carrying a trigger information field), send data corresponding to any AC; or a third sending unit 846 configured to, when an AC is designated in the trigger frame or the radio frame carrying a trigger information field, there is no data corresponding to the designated AC of the non-AP STA which is waiting to be transmitted, and when there is data to be transmitted in a buffer queue of other AC of the non-AP STA, send, by the non-AP STA, the data corresponding to the other AC, and when there is no data to be transmitted in a buffer queue of any AC of the non-AP STA, send service stream data which is transmitted in a non-competitive manner; or when an AC is designated in the trigger frame or the radio frame carrying a trigger information field, by default, at least send, by the non-AP STA, service stream data which is transmitted in a non-competitive manner; or a fourth sending unit 848 configured to, when an AC is designated in the trigger frame or the radio frame carrying a trigger information field, by default, always send service stream data which is transmitted in a non-competitive manner; or a fifth sending unit 8410 configured to, when an AC is designated in the trigger frame or the radio frame carrying a trigger information field, send in top priority data corresponding to the designated AC, and when a total length of the data to be transmitted in the buffer queue of the designated AC does not reach a designated length of an uplink data packet, send data of other AC and/or send service stream data which is transmitted in a non-competitive manner.

Figure 10:
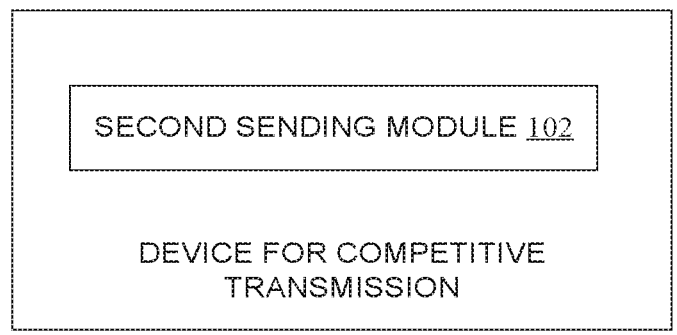
FIG. 10 is a fifth block diagram illustrating a device for competitive transmission according to an embodiment of the present disclosure.

FIG. 10 is a fifth block diagram illustrating a device for competitive transmission according to an embodiment of the present disclosure. As shown in FIG. 10, the device also includes a second sending module 102 configured to, when it is designated in the trigger frame or the radio frame carrying a trigger information field to transmit service stream data which is transmitted in a non-competitive manner, send, by the non-AP STA, service stream data which is transmitted in a non-competitive manner.

Optionally, the second sending module 102 is further configured to, when there is no service stream data which is transmitted in a non-competitive manner for the non-AP STA to send, send data in a queue of any AC.

Optionally, the data contains a length of a buffer queue of each of the one or more ACs of the non-AP STA.

Figure 11:
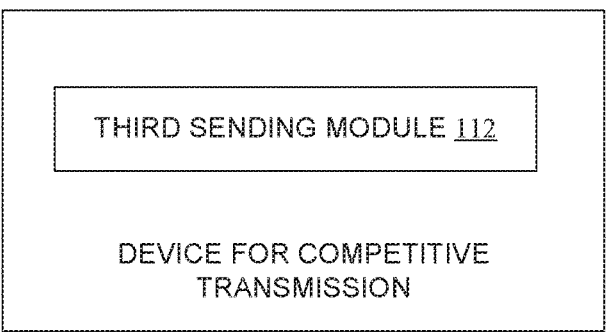
FIG. 11 is a sixth block diagram illustrating a device for competitive transmission according to an embodiment of the present disclosure.

FIG. 11 is a sixth block diagram illustrating a device for competitive transmission according to an embodiment of the present disclosure. As shown in FIG. 11, the device further includes a third sending module 112 configured to report to the AP a length of the buffer queue of the service stream which is transmitted in a non-competitive manner.

Figure 12:
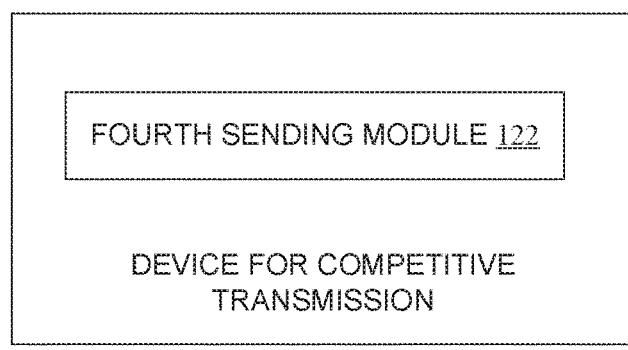
FIG. 12 is a seventh block diagram illustrating a device for competitive transmission according to an embodiment of the present disclosure.

FIG. 12 is a seventh block diagram illustrating a device for competitive transmission according to an embodiment of the present disclosure. As shown in FIG. 12, the device further includes a fourth sending module 122 configured to, when the non-AP STA does not receive the trigger frame or the radio frame carrying a trigger information field for a predetermined time period, send the service stream data which is transmitted in a non-competitive manner.

Optionally, the trigger frame or the radio frame carrying a trigger information field carries scheduling information of the non-AP STA, and both of the trigger frame and the radio frame carrying a trigger information field are for triggering the one or more non-AP STAs to perform UL MU transmission.

In an embodiment of the present disclosure, there is also provided another device for competitive transmission, which is applied in a non-AP STA. The device includes all of the above receiving modules, configured to receive a trigger frame or a radio frame carrying a trigger information field sent by an AP; a first sending module configured to send data to the AP according to the trigger frame or the radio frame carrying a trigger information field. The trigger frame or the radio frame carrying a trigger information field carries an access category designated by the AP for the one or more non-AP STAs to transmit data of that access category in the UL MU transmission. Optionally, the trigger frame or the radio frame carrying a trigger information field carries instruction information for the AP instructing the non-AP STA to send service stream data which is transmitted in a non-competitive manner.

Optionally, the above another device for competitive transmission also includes the above setup module configured to, when a response message is received from the AP, reset a CW of an AC corresponding to the data to an initial value; and a zero clearing module configured set to zero a Backoff timer of an AC corresponding to the data.

Optionally, in the above another device also for competitive transmission, the first sending module also includes the above first sending unit, configured to, when an AC is designated in the trigger frame or the radio frame carrying a trigger information field, send, by the non-AP STA, data corresponding to the designated AC; or, when an AC is designated in the trigger frame or the radio frame carrying a trigger information field, send, by the non-AP STA, data corresponding to an AC of a priority level equal to or higher than the designated AC; or when an AC is designated in the trigger frame or the radio frame carrying a trigger information field, send data corresponding to any AC, at least including data corresponding to the designated AC; or a second sending unit configured to, when an AC is or is not designated in the trigger frame or the radio frame carrying a trigger information field (that is, irrelevant whether an AC is designated in the trigger frame or the radio frame carrying a trigger information field), send data corresponding to any AC; or a third sending unit configured to, when an AC is designated in the trigger frame or the radio frame carrying a trigger information field, there is no data corresponding to the designated AC of the non-AP STA which is waiting to be transmitted, and when there is data to be transmitted in a buffer queue of other AC of the non-AP STA, send, by the non-AP STA, the data corresponding to the other AC, and when there is no data to be transmitted in a buffer queue of any AC of the non-AP STA, send service stream data which is transmitted in a non-competitive manner; or when an AC is designated in the trigger frame or the radio frame carrying a trigger information field, by default, at least send, by the non-AP STA, service stream data which is transmitted in a non-competitive manner; or a fourth sending unit configured to, when an AC is designated in the trigger frame or the radio frame carrying a trigger information field, by default, always send service stream data which is transmitted in a non-competitive manner; or a fifth sending unit configured to, when an AC is designated in the trigger frame or the radio frame carrying a trigger information field, send in top priority data corresponding to the designated AC, and when a total length of the data to be transmitted in the buffer queue of the designated AC does not reach a designated length of an uplink data packet, send data of other AC and/or send service stream data which is transmitted in a non-competitive manner.

Optionally, the above another device for competitive transmission also includes the above second sending module, configured to, when it is designated in the trigger frame or the radio frame carrying a trigger information field to transmit service stream data which is transmitted in a non-competitive manner, send, by the non-AP STA, service stream data which is transmitted in a non-competitive manner.

Optionally, the second sending module of the above another device for competitive transmission is further configured to, when there is no service stream data which is transmitted in a non-competitive manner for the non-AP STA to send, send data in a queue of any AC.

Optionally, in the above another device for competitive transmission, the data contains a length parameter of a buffer queue of each of the one or more ACs of the non-AP STA.

Optionally, the above another device for competitive transmission also includes the above third sending module, configured to report to the AP a length of the buffer queue of the service stream which is transmitted in a non-competitive manner.

Optionally, the above another device for competitive transmission also includes the above fourth sending module, configured to, when the non-AP STA does not receive the trigger frame or the radio frame carrying a trigger information field for a predetermined time period, send, by the non-AP STA, the service stream data which is transmitted in a non-competitive manner through any transmitting opportunity obtained by any AC in competition.

It should be noted that, each of the above modules may be implemented by software or hardware. When implemented by hardware, the above modules may be implemented by, but not limited to, the following manners. The above modules are disposed in the same processor; optionally, the above modules are respectively disposed in a first processor, a second processor, a third processes, and so on.

The above problem existing in the related art will be further described with reference to specific optional embodiments below.

First Embodiment

Figure 13:
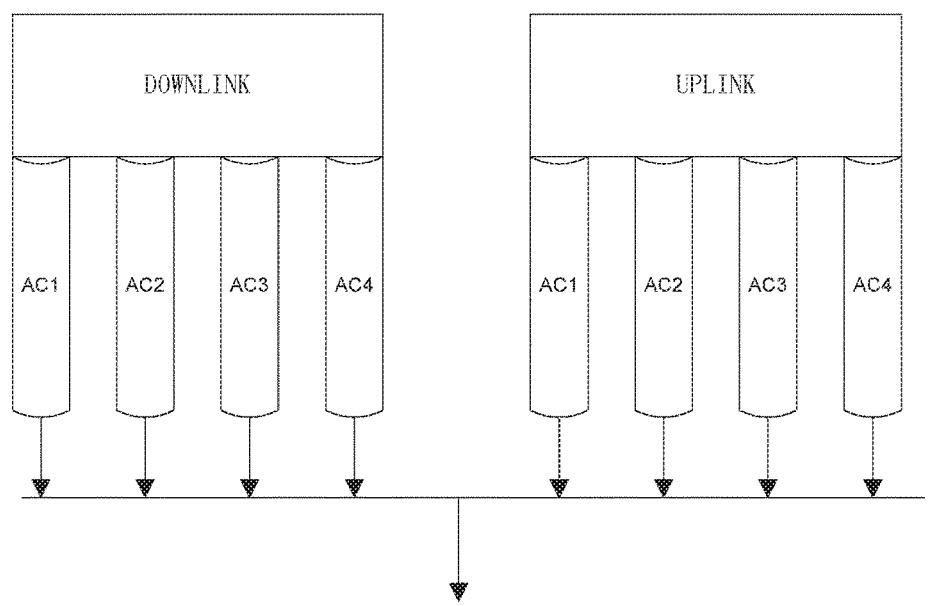
FIG. 13 is a first diagram illustrating an example of an AP establishing uplink AC queues for stations according to an embodiment of the present disclosure.

Service stream data may be transmitted between an AP and a STA in one of two transmission manners: a non-competitive manner and a competitive manner. For the competitive manner, data is waiting in an AC queue for transmission in competition. FIG. 13 is a first diagram illustrating an example of an AP establishing uplink AC queues for stations according to an embodiment of the present disclosure. As shown in FIG. 13, length information of buffer queues of four AC queues of the one or more STAs associated with the AP, which is reported by the one or more STAs, is collected at the AP side. The AC priorities are successively, in a low to high order, AC-BK (background), AC-BE (best effort), AC-VI (video) and AC-VO (voice). Four uplink AC queues are established at the AP side. Data of the STAs which belongs to the same AC queue is waiting in the same queue for transmission. The four AC queues compete with the four downlink AC queues of the AP simultaneously. For the service stream transmitted in the non-competitive manner, the STA may also report to the AP lengths of the one or more buffer queues of service stream sent in the non-competitive manner.

When one of the uplink ACs (for example, the AC-VO) wins in the competition, the AP sends a trigger frame or a frame carrying a trigger information field. The AP schedules the STA1~STA4 to perform UL MU data transmission through the trigger frame or the trigger information field, and the AP designates in the trigger frame that the data to be transmitted by the STA1~STA4 is data in the AC-VO queue.

The STA1~STA4 receive the trigger frame, and perform the UL MU transmission according to the scheduling information and time-frequency offset calibration information in the trigger frame. As the AP designates that the data to be transmitted is the data in the AC-VO queue, each of the STA1~STA4 send data in the AC-VO queue.

The AP may also respectively instruct each STA to transmit data in which AC queue. For example, the AP may instruct the STA1 to transmit data of AC-VO, instruct the STA2 and STA3 to transmit data of AC-BE, and instruct the STA4 to transmit data of AC-VI. In this case, upon receiving the trigger frame, the STA1 sends data in the AC-VO queue, the STA2 and STA3 send data in the AC-BE queue, and the STA4 sends data in the AC-VI queue.

The AP receives the UL MU data, completes checksum and demodulation successfully, and resets a CW of the uplink AC-VO queue at the AP side to an initial value CWmin.

The AP sends a confirmation frame to the STAs for the received UL MU data. Upon receiving the confirmation frame, the STAs reset the respective CW of the AC-VO queue to the initial value CWmin, and reset the Backoff timer of the AC-VO queue to zero.

The AP receives the data sent by the STA1~STA4. The AP adjusts the length parameter of the uplink AC-VO buffer queue at the AP side according to the number of the data packets. If the STA1~STA4 carry the lengths of the buffer queues of one or more ACs of the respective STA in the UL data, the AP updates the length parameter of the buffer queue of the corresponding uplink AC at the AP side according to the information provided by the stations.

Second Embodiment

Length information of buffer queues of four AC queues of the one or more STAs associated with the AP, which is reported by the one or more STAs, is collected at the AP side. The four queues are respectively AC-BK (background), AC-BE (best effort), AC-VI (video) and AC-VO (voice). Four uplink AC queues are established at the AP side. Data of the STAs which belongs to the same AC queue is waiting in the same queue for transmission. The four AC queues compete with the four downlink AC queues of the AP simultaneously.

If the uplink AC-VO wins in the competition, the AP sends a trigger frame or a radio frame carrying a trigger information field. The AP schedules the STA1~STA4 to perform UL MU data transmission through the trigger frame, and the AP designated in the trigger frame that the data to be transmitted by the STA1~STA4 is data in the AC-VO queue.

The STA1~STA4 receive the trigger frame, and perform the UL MU transmission according to the scheduling information and time-frequency offset calibration information in the trigger frame. The AP designates that the data to be transmitted is the data in the AC-VO queue, and each of the STA1~STA4 may send data in any AC queue, ensuring at least including the data in the AC-VO queue.

The AP may also respectively instruct each STA to transmit data in which AC queue. For example, the AP may instruct the STA1 to transmit data of AC-VO, instruct the STA2 to transmit data of AC-BE, and instruct the STA3 and STA4 to transmit data of AC-VI. In this case, upon receiving the trigger frame, the STA1 at least sends data in the AC-VO queue, the STA2 at least sends data in the AC-BE queue, and the STA3 and STA4 at least send data in the AC-VI queue. The STAs may also send data in any other AC queue than the data in the above designated AC queue.

The AP receives the UL MU data, completes checksum and demodulation successfully, and resets a CW of the uplink AC-VO queue at the AP side to an initial value CWmin.

The AP sends a confirmation frame to the STAs for the received UL MU data. Upon receiving the confirmation frame, the STAs reset the CW of the queue corresponding to the data that has been transmitted by the respective STA, to the initial value CWmin, and reset the Backoff timer of the AC queue to zero.

The AP receives the data sent by the STA1~STA4. The AP adjusts at the AP side the length parameter of the uplink AC-VO buffer queue and the length parameter of other uplink AC buffer queue corresponding to the received data. If the STA1~STA4 carry the lengths of the buffer queues of one or more ACs of the respective STA in the UL data, the AP updates the length parameter of the buffer queue of the corresponding uplink AC at the AP side according to the information provided by the stations.

Third Embodiment

Length information of buffer queues of four AC queues of the one or more STAs associated with the AP, which is reported by the one or more STAs, is collected at the AP side. The four queues are respectively AC-BK (background), AC-BE (best effort), AC-VI (video) and AC-VO (voice). Four uplink AC queues are established at the AP side. Data of the STAs which belongs to the same AC queue is waiting in the same queue for transmission. The four AC queues compete with the four downlink AC queues of the AP simultaneously.

When one of the ACs (for example, the AC-VO) wins in the competition, the AP sends a trigger frame according to the completion parameter of the AC-VO.

The AP schedules the STA1~STA4 to perform UL MU data transmission through the trigger frame, and the AP does not designate an AC in the trigger frame for the STA1~STA4 to transmit data of that AC.

The STA1~STA4 receive the trigger frame, and perform the UL MU transmission according to the scheduling information and time-frequency offset calibration information in the trigger frame. As the AP does not designate an AC queue to be transmitted, the STA1~STA4 may send data in any AC queue in A-MPDU.

Optionally, the AP designates in the trigger frame that the AC from which STA1~STA4 send data is AC-VO. However, the STA1~STA4 may send data of any AC queue in A-MPDU upon receiving the trigger frame.

Optionally, the AP may respectively instruct each STA to transmit data in which AC queue. For example, the AP may instruct the STA1 to transmit data of AC-VO, instruct the STA2 to transmit data of AC-BE, and instruct the STA3 and STA4 to transmit data of AC-VI. However, upon receiving the trigger frame, the STAs may send data of any AC queue.

The AP receives the UL MU data, completes checksum and demodulation successfully, and resets a CW of the corresponding uplink AC queue at the AP side to an initial value CWmin.

The AP sends a confirmation frame to the STAs for the received UL MU data. Upon receiving the confirmation frame, the STAs reset the CW of the AC queue corresponding to the data that has been transmitted by the respective STA, to the initial value CWmin, and reset the Backoff timer of the AC queue to zero.

The AP receives the data sent by the STA1~STA4. The AP adjusts at the AP side the length parameter of the uplink AC buffer queue corresponding to the received data. If the STA1~STA4 carry the lengths of the buffer queues of one or more ACs of the respective STA in the UL data, the AP updates the length parameter of the buffer queue of the corresponding uplink AC at the AP side according to the information provided by the stations.

Fourth Embodiment

Length information of buffer queues of four AC queues of the one or more STAs associated with the AP, which is reported by the one or more STAs, is collected at the AP side. Four uplink AC queues are established at the AP side. The four AC queues compete with the four downlink AC queues of the AP simultaneously.

When one of the ACs (for example, the AC-BE) wins in the competition, the AP sends a trigger frame or a frame carrying a trigger information field. The AP schedules the STA1~STA4 to perform UL MU data transmission through the trigger frame or the radio frame carrying a trigger information field, and the AP designated in the trigger frame that the AC allowing for access is AC-BE.

Upon receiving the trigger frame, the STA1~STA4 allow sending data of an AC having a priority level equal to or higher than the priority of the AC-BE queue. That is, the STA1~STA4 may send data of the AC-BE queue, the AC-VI queue and the AC-VO queue.

The AP may also respectively instruct each STA to transmit data in which AC queue. For example, the AP may instruct the STA1 to transmit data of AC-VO, instruct the STA2 to transmit data of AC-BE, and instruct the STA3 and STA4 to transmit data of AC-VI. In this case, upon receiving the trigger frame, the STA1 allows sending data in the AC-VO queue, the STA2 allows sending data in the AC-BE queue, the AC-VI queue and the AC-VO queue, and the STA3 and STA4 allow sending data in the AC-VI queue and the AC-VO queue.

The AP receives the UL MU data, completes checksum and demodulation successfully, and resets a CW of the uplink AC-BE queue at the AP side to an initial value CWmin.

The AP sends a confirmation frame to the STAs for the received UL MU data. Upon receiving the confirmation frame, the STAs reset the CW of the AC queue corresponding to the data that has been transmitted by the respective STA, to the initial value CWmin, and reset the Backoff timer of the AC queue to zero.

The AP receives the data sent by the STA1~STA4. The AP adjusts at the AP side the length parameter of the uplink AC buffer queue according to the number of the data packets. If the STA1~STA4 carry the lengths of the buffer queues of one or more ACs of the respective STA in the UL data, the AP updates the length parameter of the buffer queue of the corresponding uplink AC at the AP side according to the information provided by the stations.

Fifth Embodiment

Figure 14:
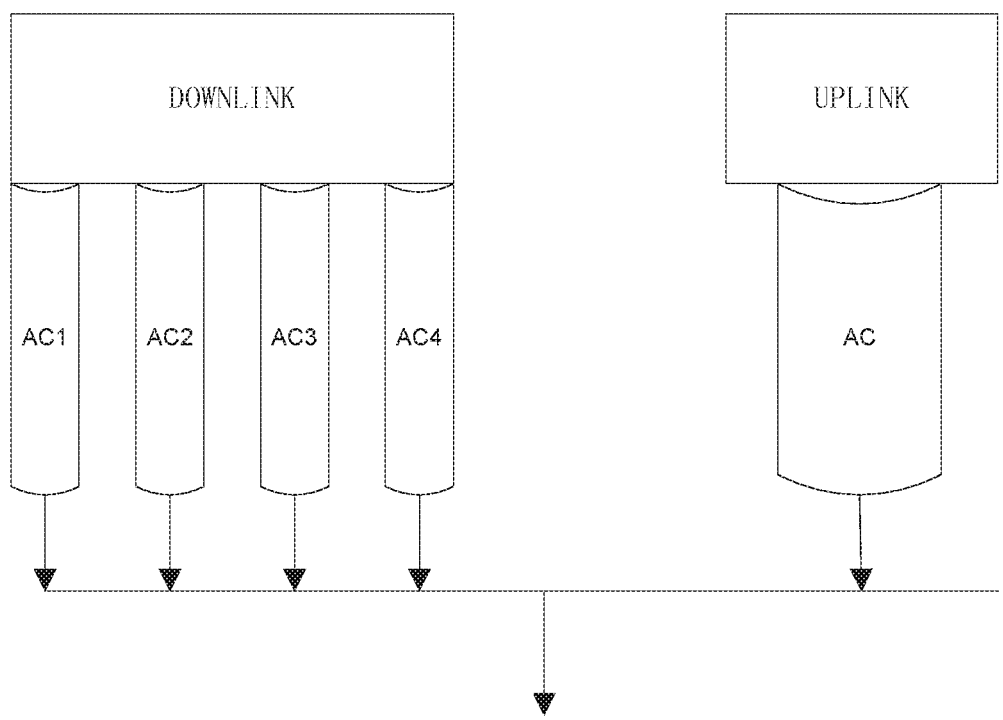
FIG. 14 is a second diagram illustrating an example of an AP establishing an uplink AC queue for stations according to an embodiment of the present disclosure.

FIG. 14 is a second diagram illustrating an example of an AP establishing uplink AC queues for stations according to an embodiment of the present disclosure. As shown in FIG. 14, only one uplink queue is established at the AP side. Data of all ACs of the STAs is waiting in the queue for transmission in competition. The uplink queue has a completion parameter previously setup by the system. When a data wins in the competition, the AP sends a trigger frame and triggers UL MU transmission.

The STA1~STA4 receive the trigger frame, and perform the UL MU transmission according to the scheduling information and time-frequency offset calibration information in the trigger frame. The AP designates that the current AC for UL MU transmission is AC-VO for the STA1~STA4, or respectively for each station, designates an AC for UL MU transmission. If there is no buffer data in the AC queue designated to transmit of the stations, buffer data in other AC queue may be transmitted. If there is no data to be transmitted in any of the four AC buffer queue of the stations, the stations may send the service stream data which is transmitted in a non-competitive manner.

The stations perform UL MU transmission. The AP receives the UL data sent by the stations, completes checksum and demodulation successfully, and resets a CW of the corresponding uplink AC queue at the AP side to an initial value CWmin.

The AP receives the data sent by the STA1~STA4. If the STA1~STA4 carry the lengths of the buffer queues of one or more ACs of the respective STA in the UL data, the AP updates the length parameter of the buffer queue of the corresponding uplink AC at the AP side according to the information provided by the stations.

Sixth Embodiment

The AP instructs in the system information a sending time instant for one or more trigger frames or radio frames having a trigger information field, and sends a trigger frame or a radio frame having a trigger information field when it arrives at the predetermined sending time instant.

The AP collects the lengths of the buffer queues for sending the service stream in the non-competitive manner which are reported by the STAs. The AP designates in the trigger frame of the radio frame carrying a trigger information field that the data transmitted by the stations in UL MU transmission is the service stream data which is sent in the non-competitive manner. In this case, the trigger frame of the radio frame carrying a trigger information field does not carry an AC identification, but carries an identification of a service stream which is to be transmitted in the non-competitive manner.

The stations receive the trigger frame or the radio frame carrying the trigger information field, and send the service stream data which is transmitted in the non-competitive manner. If there is no service stream data which is transmitted in a non-competitive manner for the stations to transmit, the stations may send data in any AC queue.

Seventh Embodiment

The AP instructs in the system information a sending time instant for one or more trigger frames or radio frames having a trigger information field, and sends a trigger frame or a radio frame having a trigger information field when it arrives at the predetermined sending time instant. If the stations do not receive the trigger frame or the radio frame carrying a trigger information field from the AP at the predetermined sending time instant, the stations may send the service stream data which is transmitted in a non-competitive manner through any transmitting opportunity obtained by any AC in competition.

Eighth Embodiment

Length information of buffer queues of four AC queues of the one or more STAs associated with the AP, which is reported by the one or more STAs, is collected at the AP side. The four queues are respectively AC-BK (background), AC-BE (best effort), AC-VI (video) and AC-VO (voice). Four uplink AC queues are established at the AP side. Data of the STAs which belongs to the same AC queue is waiting in the same queue for transmission. The four AC queues compete with the four downlink AC queues of the AP simultaneously. Optionally, one uplink AC queue is established at the AP side, and data of all AC queues of all the STAs is waiting in the queue for transmission in competition.

When the uplink AC wins in the competition, the AP sends a trigger frame or a frame carrying a trigger information field, to trigger the STA1~STA4 to perform UL MU data transmission. The AP instructs in the trigger frame or the radio frame carrying a trigger information field that the STA1~STA4 send data of AC-VI, and the above stations send data of AC-VI. Optionally, the stations may send data of AC-VI and data of an AC having a priority level higher than that of AC-VI, i.e. data of AC-VO. Moreover, in the above two transmission modes, by default, the stations may always send the service stream data which is transmitted in the non-competitive manner. It is possible to regard the service stream which is transmitted in the non-competitive manner has the highest priority, and may always be sent in any situations.

The AP may also respectively instruct each STA to transmit data in which AC queue. For example, the AP may instruct the STA1 to transmit data of AC-VO, instruct the STA2 to transmit data of AC-BE, and instruct the STA3 and STA4 to transmit data of AC-VI. In this case, upon receiving the trigger frame, the STA1 sends data in the AC-VO queue, the STA2 and the STA3 send data in the AC-BE queue or data having a priority level higher than that of the AC-BE, and STA4 sends data in the AC-VI queue or data having a priority level higher than that of the AC-VI. In addition, in the above transmission modes, the stations may also send the service stream data which is transmitted in the non-competitive manner.

The stations perform uplink data transmission. The AP receives the uplink data transmitted by the stations, completes checksum and demodulation successfully, and resets a CW of the corresponding uplink AC queue at the AP side to an initial value CWmin.

The AP receives the data sent by the STA1~STA4. The AP updates the length parameters of the corresponding uplink AC buffer queue and of the buffer queue of the service stream which is transmitted in the non-competitive manner, according to the number of the received data packets. If the STA1~STA4 carry in the UL data the lengths of the buffer queues of one or more ACs of the respective STA and the length parameter of the buffer queue of the service stream which is transmitted in the non-competitive manner, the AP updates the length parameter of the buffer queue of the corresponding uplink AC at the AP side according to the information provided by the stations.

Ninth Embodiment

The AP sends a trigger frame or a frame carrying a trigger information field, to trigger the STA1~STA4 to perform UL MU transmission. The AP instructs in the trigger frame or the radio frame carrying a trigger information field that the STA1~STA4 send data of AC-VI, and the above stations send data of AC-VI. Optionally, the stations may send data of AC-VI and data of an AC having a priority level higher than that of AC-VI, i.e. data of AC-VO. Moreover, in the above two transmission modes, by default, the stations may at least send the service stream data which is transmitted in the non-competitive manner (and may send no data when there is no data to be transmitted in that queue).

The AP may also respectively instruct each STA to transmit data in which AC queue. For example, the AP may instruct the STA1 to transmit data of AC-VO, instruct the STA2 to transmit data of AC-BE, and instruct the STA3 and STA4 to transmit data of AC-VI. In this case, upon receiving the trigger frame, the STA1 sends data in the AC-VO queue, the STA2 and the STA3 send data in the AC-BE queue or data having a priority level higher than that of the AC-BE, and STA4 sends data in the AC-VI queue or data having a priority level higher than that of the AC-VI. In addition, in the above transmission modes, the stations at least send the service stream data which is transmitted in the non-competitive manner.

The stations perform uplink data transmission. The AP receives the uplink data transmitted by the stations, completes checksum and demodulation successfully, and resets a CW of the corresponding uplink AC queue at the AP side to an initial value CWmin.

The AP receives the data sent by the STA1~STA4. The AP updates the length parameters of the corresponding uplink AC buffer queue and of the buffer queue of the service stream which is transmitted in the non-competitive manner, according to the number of the received data packets. If the STA1~STA4 carry in the UL data the lengths of the buffer queues of one or more ACs of the respective STA and the length parameter of the buffer queue of the service stream which is transmitted in the non-competitive manner, the AP updates the length parameter of the buffer queue of the corresponding uplink AC at the AP side according to the information provided by the stations.

Tenth Embodiment

The AP sends a trigger frame or a frame carrying a trigger information field, to trigger the STA1~STA4 to perform UL MU transmission. The AP instructs in the trigger frame or the radio frame carrying a trigger information field that the STA1~STA4 send in top priority data of AC-VI, and the above stations send data of AC-VI. If all of the data buffered in the AC-VI queue packaged in a MAC layer protocol data unit has a length less than the packet length of an uplink transmission designated by the AP, the stations may continue to package data of other AC queue into the current MAC layer protocol data unit, or package the service stream data which is transmitted in the non-competitive manner into the current MAC layer protocol data unit.

The AP may also respectively instruct each STA to transmit data in which AC queue. For example, the AP may instruct the STA1 to transmit data of AC-VO, instruct the STA2 to transmit data of AC-BE, and instruct the STA3 and STA4 to transmit data of AC-VI. In this case, upon receiving the trigger frame, the STA1 sends in top priority data of the AC-VO queue, the STA2 and the STA3 send in top priority data of the AC-BE queue, and STA4 sends in top priority data of the AC-VI queue. If all of the data buffered in the AC queue of the highest priority packaged in a MAC layer protocol data unit has a length less than the packet length of an uplink transmission designated by the AP, the stations may continue to package data of other AC queue into the current MAC layer protocol data unit, or package the service stream data which is transmitted in the non-competitive manner into the current MAC layer protocol data unit.

The stations perform uplink data transmission. The AP receives the uplink data transmitted by the stations, completes checksum and demodulation successfully, and resets a CW of the corresponding uplink AC queue at the AP side to an initial value CWmin.

The AP receives the data sent by the STA1~STA4. The AP updates the length parameters of the corresponding uplink AC buffer queue and of the buffer queue of the service stream which is transmitted in the non-competitive manner, according to the number of the received data packets. If the STA1~STA4 carry in the UL data the lengths of the buffer queues of one or more ACs of the respective STA and the length parameter of the buffer queue of the service stream which is transmitted in the non-competitive manner, the AP updates the length parameter of the buffer queue of the corresponding uplink AC at the AP side according to the information provided by the stations.

Accordingly, according to the present disclosure, during the UL MU transmission triggered by the AP, it can timely adjust the competition parameter at the station side according to the data transmission state. It can reflect the busy and idle states of the channel and can keep the competition parameters of the same queue at the AP side and the non-AP station in synchronization, providing better fairness for the competition among the stations in the entire network.

In another embodiment, there is also provided software for executing the technical solutions described in the above embodiments and the optional embodiments.

In another embodiment, there is also provided a storage medium for storing the above software. The storage medium includes but not limited to an optical disk, a floppy disk, a hard disk, a rewritable memory, and the like.

Apparently, it should be appreciated by those skilled in the art that, the modules or steps of the present disclosure described above may be implemented by a general-purposed computing device. The modules or steps may be integrated in a single computing device, or may be distributed over a network formed by multiple computing devices. Optionally, the modules or steps may be implemented with program codes executable by a computing device so that they may be stored in a storage device for execution by a computing device. In some cases, the steps illustrated or described may be performed in an order different from the order herein, or the steps may be made into integrated circuit modules respectively. Optionally, the modules or steps may be implemented by a single integrated circuit module. As such, the present disclosure is not limited to any specific combination of hardware and software.

The foregoing descriptions are merely optional embodiments of the present disclosure and are not intended to limit the present disclosure. For those skilled in the art, the present disclosure may have various modifications and alterations. Any modification, equivalent replacement, improvement, etc. within the spirit and principle of the present disclosure should be included in the protection scope of the present disclosure.

INDUSTRIAL UTILITY

As described above, the method and the device for competitive transmission provided in the embodiments of the present disclosure have the following beneficial effects. It can solve the problem in the related art as how to set the competition parameters at the AP side and the non-AP station side, after a trigger frame is sent in a competitive manner, and can ensure that the competition parameters of the same queue at the AP side and the non-AP station side are kept in synchronization. Moreover, it may present the busy and idle states of the channel

What is claimed is:

1. A method for competitive transmission, comprising:
receiving, by a non-access-point station (non-AP STA), a trigger frame or a radio frame carrying a trigger information field sent by an access point (AP);
transmitting, by the non-AP STA, data to the AP according to the trigger frame or the radio frame carrying a trigger information field;
resetting, by the non-AP STA, a contention window (CW) of an access category (AC) corresponding to the data to an initial value, upon receiving a response message from the AP; and
after transmitting the data to the AP and receiving the response message from the AP, setting to zero, by the non-AP STA, a Backoff timer of the AC corresponding to the data.

2. The method according to claim 1, wherein
the trigger frame or the radio frame carrying a trigger information field carries an access category designated by the AP for at least one non-AP STA to transmit data of that access category in uplink multi-user (UL MU) transmission; or
the trigger frame or the radio frame carrying a trigger information field carries instruction information for the AP instructing the non-AP STA to send service stream data which is transmitted in a non-competitive manner.

3. The method according to claim 1, wherein transmitting, by the non-AP STA, data to the AP according to the trigger frame or the radio frame carrying a trigger information field, comprises:
when an AC is designated in the trigger frame or the radio frame carrying a trigger information field, transmitting, by the non-AP STA, data corresponding to the designated AC; or
when an AC is designated in the trigger frame or the radio frame carrying a trigger information field, transmitting, by the non-AP STA, data corresponding to an AC of a priority level equal to or higher than a priority level of the designated AC; or
when an AC is designated in the trigger frame or the radio frame carrying a trigger information field, transmitting, by the non-AP STA, data of any AC, at least including data corresponding to the designated AC; or
when an AC is or is not designated in the trigger frame or the radio frame carrying a trigger information field, transmitting, by the non-AP STA, data of any AC; or
when an AC is designated in the trigger frame or the radio frame carrying a trigger information field, no data to be transmitted exists in the designated AC of the non-AP STA, and when data to be transmitted exists in a buffer queue of other AC of the non-AP STA, transmitting, by the non-AP STA, data corresponding to said other AC, and when no data to be transmitted exists in a buffer queue of any AC of the non-AP STA, transmitting, by the non-AP STA, service stream data which is transmitted in a non-competitive manner; or
when an AC is designated in the trigger frame or the radio frame carrying a trigger information field, by default, transmitting, by the non-AP STA, at least service stream data which is transmitted in a non-competitive manner; or
when an AC is designated in the trigger frame or the radio frame carrying a trigger information field, by default, always allowing the non-AP STA to transmit service stream data which is transmitted in a non-competitive manner; or
when an AC is designated in the trigger frame or the radio frame carrying a trigger information field, transmitting in top priority, by the non-AP STA, data corresponding to the designated AC; wherein when a total length of data to be transmitted in a buffer queue of the designated AC does not reach a designated length of an uplink data packet, the non-AP STA transmits data of other AC and/or transmits service stream data which is transmitted in a non-competitive manner.

4. The method according to claim 1, further comprising:
when it is designated in the trigger frame or the radio frame carrying a trigger information field to transmit service stream data which is transmitted in a non-competitive manner, transmitting, by the non-AP STA, service stream data which is transmitted in a non-competitive manner.

5. The method according to claim 3, wherein transmitting, by the non-AP STA, service stream data which is transmitted in a non-competitive manner, comprises:
   when no service stream data which is transmitted in a non-competitive manner exists for the non-AP STA, transmitting, by the non-AP STA, data of any AC.

6. The method according to claim 1, wherein the data contains a current length of a buffer queue of the AC of the non-AP STA.

7. The method according to claim 1, wherein the non-AP STA reports to the AP a length of a buffer queue of service stream which is transmitted in a non-competitive manner.

8. The method according to claim 1, further comprising:
   when the non-AP STA does not receive the trigger frame or the radio frame carrying a trigger information field for a predetermined time period, transmitting, by the non-AP STA, service stream data which is transmitted in a non-competitive manner through any transmitting opportunity obtained by any AC in competition.

9. A device for competitive transmission, applied in an non-access-point station (non-AP STA), and the device comprising a processor and a memory, wherein the memory stores instructions executable by the processor, and the processor is configured to perform:
   receiving, by a non-access-point station (non-AP STA), a trigger frame or a radio frame carrying a trigger information field sent by an access point (AP);
   transmitting, by the non-AP STA, data to the AP according to the trigger frame or the radio frame carrying a trigger information field;
   resetting, by the non-AP STA, a contention window (CW) of an access category (AC) corresponding to the data to an initial value, upon receiving a response message from the AP; and
   after transmitting the data to the AP and receiving the response message from the AP, setting to zero, by the non-AP STA, a Backoff timer of the AC corresponding to the data.

10. The device according to claim 9, wherein
   the trigger frame or the radio frame carrying a trigger information field carries an access category designated by the AP for at least one non-AP STA to transmit data of that access category in uplink multi-user (UL MU) transmission; or
   the trigger frame or the radio frame carrying a trigger information field carries instruction information for the AP instructing the non-AP STA to send service stream data which is transmitted in a non-competitive manner.

11. The device according to claim 9, wherein transmitting, by the non-AP STA, data to the AP according to the trigger frame or the radio frame carrying a trigger information field, comprises:
   when an AC is designated in the trigger frame or the radio frame carrying a trigger information field, transmitting, by the non-AP STA, data corresponding to the designated AC; or
   when an AC is designated in the trigger frame or the radio frame carrying a trigger information field, transmitting, by the non-AP STA, data corresponding to an AC of a priority level equal to or higher than a priority level of the designated AC; or
   when an AC is designated in the trigger frame or the radio frame carrying a trigger information field, transmitting, by the non-AP STA, data of any AC, at least including data corresponding to the designated AC; or
   when an AC is or is not designated in the trigger frame or the radio frame carrying a trigger information field, transmitting, by the non-AP STA, data of any AC; or
   when an AC is designated in the trigger frame or the radio frame carrying a trigger information field, no data to be transmitted exists in the designated AC of the non-AP STA, and when data to be transmitted exists in a buffer queue of other AC of the non-AP STA, transmitting, by the non-AP STA, data corresponding to said other AC, and when no data to be transmitted exists in a buffer queue of any AC of the non-AP STA, transmitting, by the non-AP STA, service stream data which is transmitted in a non-competitive manner; or
   when an AC is designated in the trigger frame or the radio frame carrying a trigger information field, by default, transmitting, by the non-AP STA, at least service stream data which is transmitted in a non-competitive manner; or
   when an AC is designated in the trigger frame or the radio frame carrying a trigger information field, by default, always allowing the non-AP STA to transmit service stream data which is transmitted in a non-competitive manner; or
   when an AC is designated in the trigger frame or the radio frame carrying a trigger information field, transmitting in top priority, by the non-AP STA, data corresponding to the designated AC; wherein when a total length of data to be transmitted in a buffer queue of the designated AC does not reach a designated length of an uplink data packet, the non-AP STA transmits data of other AC and/or transmits service stream data which is transmitted in a non-competitive manner.

* * * * *